No. 12,598. REISSUED JAN. 22, 1907.

J. A. CALDWELL.

MECHANICAL STOKER.

APPLICATION FILED NOV. 28, 1906.

4 SHEETS—SHEET 1.

Witnesses
C. W. Benjamin
C. H. Kaufmann

Inventor
John A. Caldwell,
By his Attorneys
Daniel Davis

No. 12,598. REISSUED JAN. 22, 1907.
J. A. CALDWELL.
MECHANICAL STOKER.
APPLICATION FILED NOV. 28, 1906
4 SHEETS—SHEET 2.
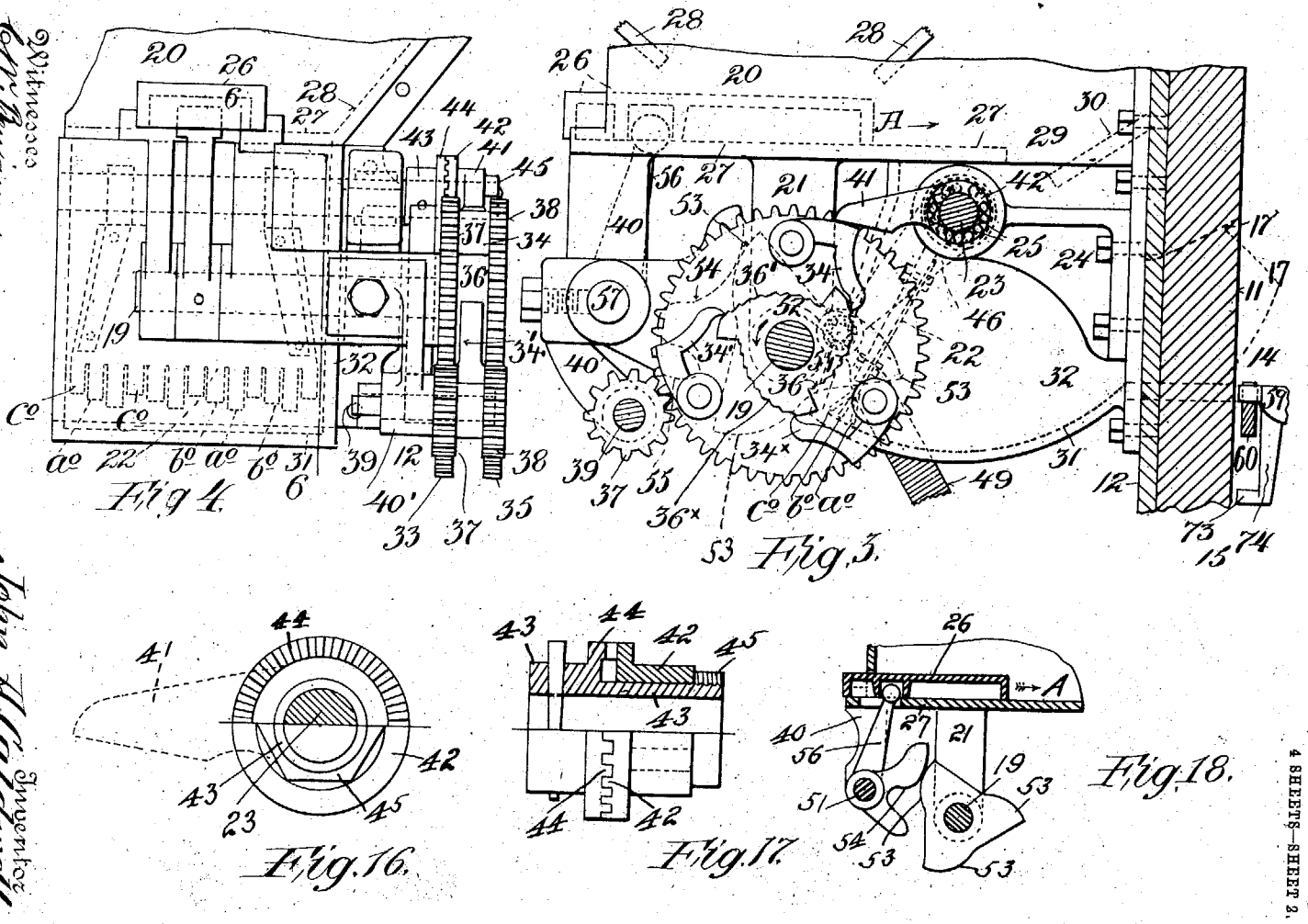
Witnesses
C. W. Benjamin
E. H. Kaufmann
Inventor
John A. Caldwell.
By his Attorneys
Dana Davis No. 12,598. REISSUED JAN. 22, 1907.
J. A. CALDWELL.
MECHANICAL STOKER.
APPLICATION FILED NOV. 28, 1906.
4 SHEETS—SHEET 3.
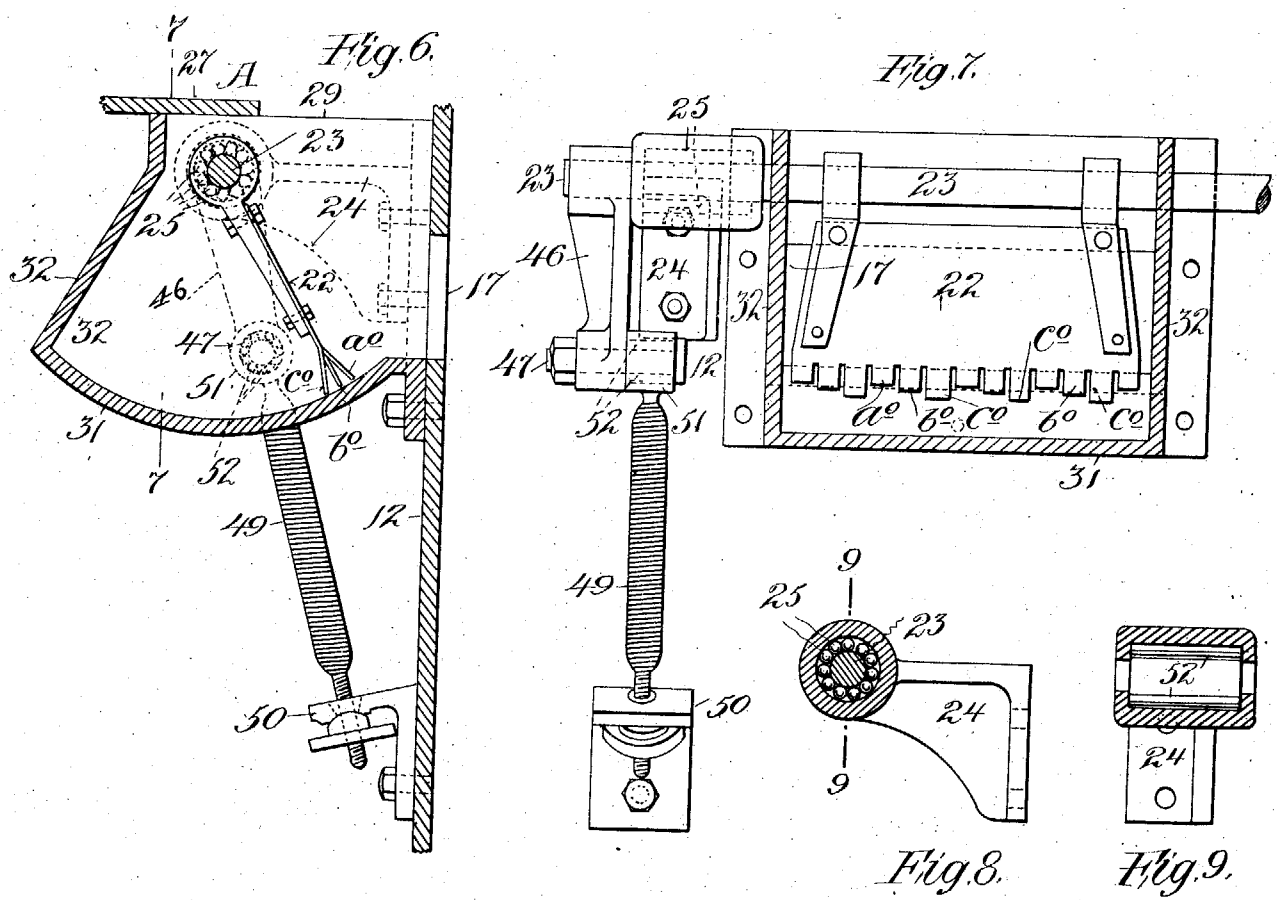
Witnesses
C. W. Benjamin
E. H. Kaufmann
Inventor
John A. Caldwell
By his Attorneys
Davis & Davis No. 12,598. REISSUED JAN. 22, 1907.
J. A. CALDWELL.
MECHANICAL STOKER.
APPLICATION FILED NOV. 28, 1906.
4 SHEETS—SHEET 4.
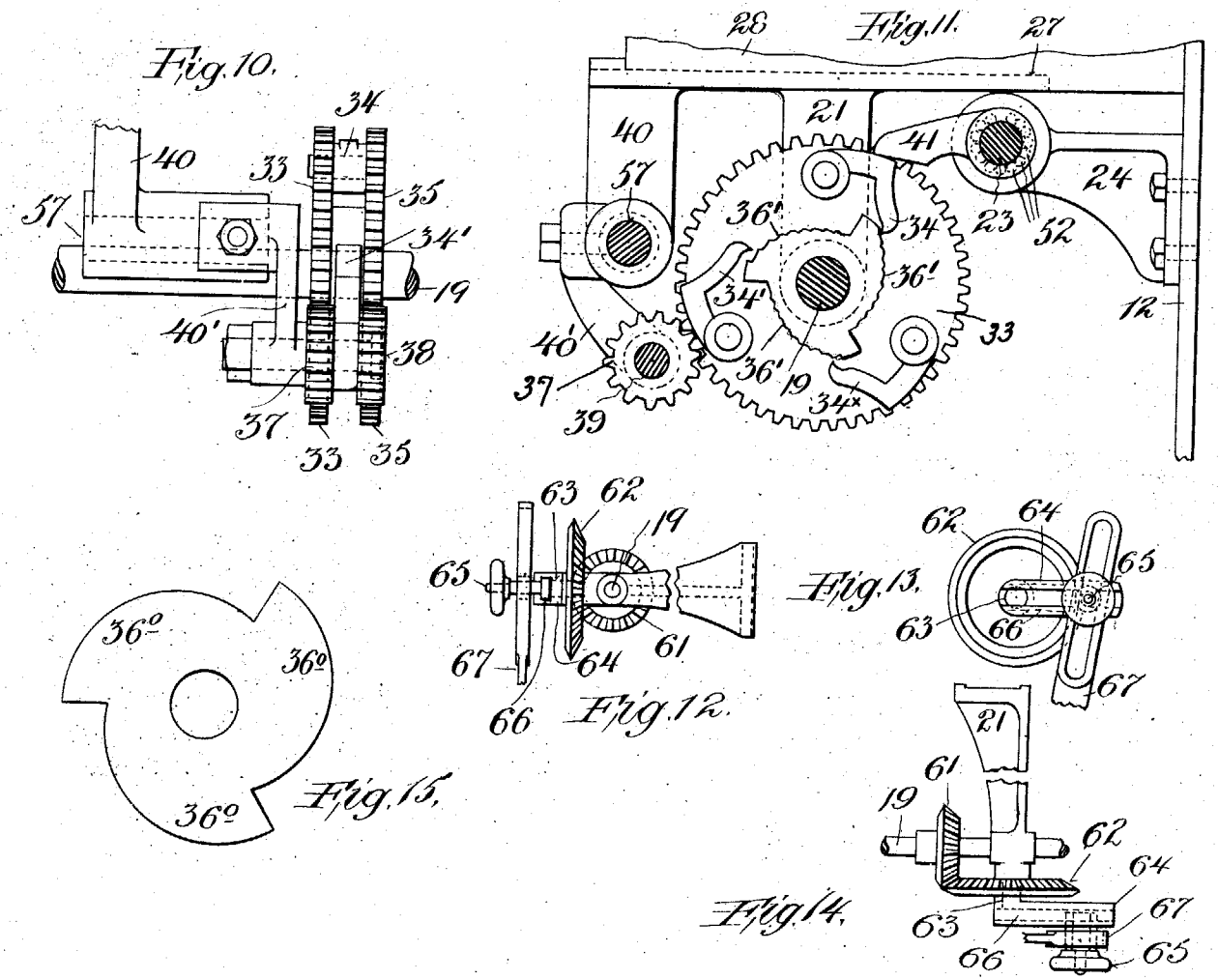
Witnesses
C. W. Benjamin
E. A. Kaufmann
Inventor
John A. Caldwell.
By his Attorneys
Davis & Davis

UNITED STATES PATENT OFFICE.

JOHN A. CALDWELL, OF MONTCLAIR, NEW JERSEY.

MECHANICAL STOKER.

No. 12,598. Specification of Reissued Letters Patent. Reissued Jan. 22, 1906.

Original No. 812,635, dated February 13, 1906. Application for reissue filed November 28, 1906. Serial No. 345,577.

*To all whom it may concern:*

Be it known that I, JOHN A. CALDWELL, a citizen of the United States, residing at Montclair, in the county of Essex and State of New Jersey, have invented certain new and useful Improvements in Mechanical Stokers, of which the following is a specification.

My invention relates to mechanical stokers for automatically supplying fuel to furnaces in general and to steam-boiler furnaces in particular.

The objects of my invention are to provide suitable mechanical means for regulating and for varying the distribution of coal upon a grate so as to secure the best and quickest heating effect obtainable from different kinds of coal, to provide a tension means for moving the fuel-distributing shovel in one direction and means by which said shovel may be moved in opposition to the tension device and then suddenly released and means for automatically adjusting said moving means so that the shovel will be moved varying distances against the tension device, whereby the throw of the shovel will be gradually and automatically increased until it has reached its maximum throw and will then be automatically returned to its minimum throw, whereby the coal will be by successive operations of the shovel distributed throughout the entire area of the grate-surface; also, to provide certain improved detail constructions in connection with my improved stoker, so as to insure its proper and efficient operation at all times. I accomplish these and other useful objects by the means hereinafter specified, and set forth more particularly in the claims.

Figure 1:
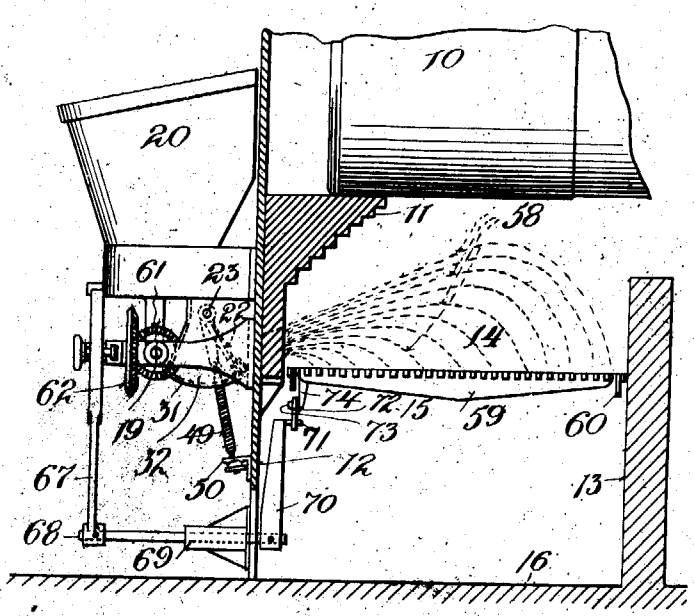
Figure 2:
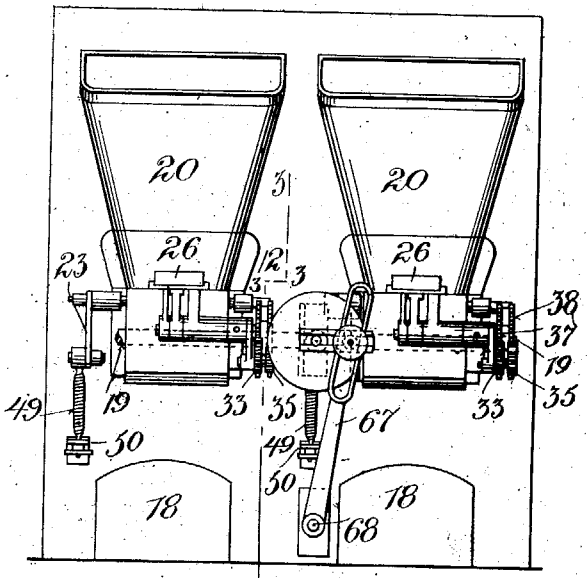
Figure 5:
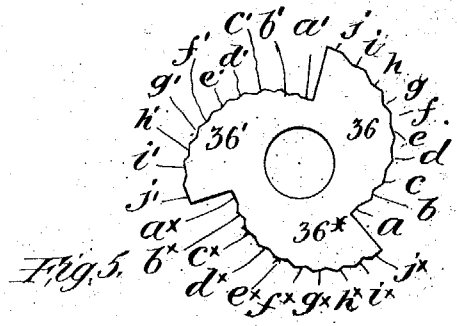

In the accompanying drawings, Figure 1 is a side view looking toward the left in Fig. 2 of a boiler-furnace equipped with my improved appliances, the furnace itself being shown in section, the means for supplying coal to the shovel, however, not being shown therein, Fig. 2 being a front view of a portion of a boiler-furnace provided with my improved mechanical stokers. Figs. 3 and 4 are detail views illustrating portions of the stoker mechanism, Fig. 3 being a section along line 3 3 in Fig. 2 and Fig. 4 an end view of the construction shown in Fig. 3. Fig. 5 is a diagrammatic illustration of a detail. Fig. 6 is a section along line 6 6 in Fig. 4 looking toward the left and illustrating more particularly the shovel and the box in which it travels, while Fig. 7 is a section along line 7 7 in Fig. 6 looking toward the right. Fig. 8 is a side view, partly in section, of a bracket with antifriction-rollers, upon which the shovel-shaft is mounted, while Fig. 9 is a section along line 9 9 in Fig. 8. Fig. 10 is a front view, and Fig. 11 a side view, of the gearing and connecting parts employed by me for actuating the shovel-shaft. Fig. 12 is a side view, and Fig. 13 a front view, and Fig. 14 a top view, of the upper portion of the mechanism employed for imparting movement from the shaft operating the stokers to the rocking grate employed by me. Fig. 15 illustrates a modification of a cam-wheel forming portion of my apparatus. Fig. 16 is a detail, partly in cross-section and partly in end view, and Fig. 17 partly a longitudinal section and partly a front view, of the same detail. Fig. 18 is an elevation, partly in section, of mechanism for supplying coal to the shovel.

Corresponding characters of reference throughout the different views refer to corresponding parts.

In said drawings, 10 is the front portion of a boiler supported upon brickwork 11.

12 is the metallic boiler-front; 13, the bridge-wall; 14, the furnace; 15, the furnace-grate, and 16 the ash-pit underneath the same.

17 is an opening extending through parts 11 and 12, through which coal or other fuel is projected by the stoker upon the grate from the outside of the furnace.

18 represents the openings to the ash-pit.

19 is the main shaft for operating a number of mechanical stokers for supplying either one or a multiplicity of furnaces with coal or other fuel.

20 20 are hoppers attached to the boiler-front and from which coal or other similar fuel is supplied to the stokers, one hopper generally supplying one stoker.

21 21 are brackets attached to the hoppers and carrying the bearings for main shaft 19.

Each of the stokers comprises a shovel for throwing coal upon the fire and a ram for supplying a predetermined quantity of fuel to the shovel and mechanisms actuated by shaft 19, which revolves in the direction of the arrow in Fig. 3 for operating said parts.

22 is a shovel which oscillates with a shaft 23, mounted upon brackets 24, which brackets are secured to the boiler-front.

25 25 are roller-bearings interposed between the hub of the shovel and the shaft 23.

26 is a ram which is adapted to slide toward and away from the boiler-front upon the bottom 27 of the hopper. The position nearest to the furnace-front reached by the ram is illustrated in Figs. 3 and 18. Prior to the ram moving into said position coal moving downward between walls 28 28 of the hopper will be deposited between said ram and point A and as the ram moves toward point A in the direction of the arrows will be precipitated through an opening 29 in the bottom of the hopper upon a deflector 30, either rigidly or adjustably attached to the boiler-front and extending forward and downward therefrom, and will from there drop upon a concave platform 31, while the shovel is in a rearward position prior to throwing coal. Said platform is attached to the boiler-front and is constructed as an arch, with the axis of shaft 23 as its center of curvature, the lower end of shovel 22 being made to travel close to said platform.

32 32 are walls extending from platform 31 to the hopper, so as to inclose the coal prior to its being injected into the furnace.

For the purpose of properly actuating the stoker it is necessary to let the movements of the plunger alternate with those of the shovel, providing for one uniform movement of the plunger toward the furnace prior to each swinging movement of the shovel in the same direction, and as it is not practicable to cover the entire depth of the furnace by one throw of the shovel means must be provided for successively covering different spaces until coal has been distributed over the entire depth of the furnace. Different kinds of coal must be deposited on a fire in layers of different thicknesses to obtain best results. Thus where bituminous coal is used the application of the same in very thin layers is desirable, and it is therefore best in that case to make each successive throw cover a different space, while when anthracite is used the coal should be deposited in layers, say, about three-fourths of an inch thick, and therefore in that case a number of throws must be applied to the same space before coal is thrown upon another space. To provide for all these conditions I employ the following means: 33 is a gear-wheel fixedly mounted upon shaft 19. 34 34′ 34× are tappets hinged to said wheel. The same are actuating devices and are hereinafter termed "cam-tappets." 35 is another gear-wheel revolubly mounted upon said shaft, and 36, 36′, and 36× are cams attached to said gear-wheel 35, and said cam-tappets are adapted to successively engage with different portions of said cams, as gear 35 is being revolved with reference to gear 33. I produce such relative movements by means of pinions 37 and 38, both mounted on a shaft 39, which has its bearings upon a lower arm 40′, bolted to an extension of a bracket 40, attached to the bottom of the hopper. Pinion 37, meshing with gear 33, is revolubly mounted upon shaft 39, while pinion 38, meshing with gear 35, is fixedly but detachably secured to pinion 37. As the two gear-wheels revolve at different speeds, the cam-tappets will successively come in contact with different portions of said cams and will thereby have imparted to them movements of different extents, as more fully referred to hereinafter.

41 is a tappet fixedly secured to shaft 23 and adjusted to successively contact with the outer surfaces on the cam-tappets as gear-wheel 33 is being revolved. Tappet 41 is hereinafter termed the "shovel-tappet." For the purpose of making the contact-surface of said shovel-tappet adjustable with reference to the outer contact-surfaces on cam-tappets 34, 34′, and 34× I construct said shovel-tappet in sections, one of said sections comprising its operative contact portion provided with a uniformly-serrated rim 42 and the other portion comprising a sleeve 43, fixedly secured to shaft 23 and provided with a corresponding serrated rim 44, adapted to engage with aforesaid rim in different positions. 45 is a jam-nut in screw-thread engagement with a tubular extension on sleeve 43 for locking together the two sections of said shovel-tappet after proper adjustment has been made.

46 is an arm fixedly secured to shaft 23 and carrying a pin 47, extending parallel with the boiler-front.

Parts 41, 46, and 22 will all oscillate simultaneously during partial revolutions of shaft 23.

49 is a spiral spring having its lower end confined in a bracket 50 on the boiler-front, while its upper end, terminating in an eye 51, is articulated to pin 47, roller-bearings 52 being inserted between said eye and said pin and forming a tension means for moving the shovel in one direction.

The lower portion of shovel 22 is provided with teeth, as $a^\circ$, $b^\circ$, and $c^\circ$, teeth $a^\circ$ being deflected forward and teeth $c^\circ$ being deflected rearward from teeth $b^\circ$ and from the main body of the shovel for the purpose of more uniformly distributing coal over the particular portion of the furnace covered by each throw.

Ram 26 derives reciprocating movement from cams 53, fixedly attached to shaft 19, which cams in being revolved in the direction of the arrow in Fig. 3 alternately actuate fingers 54 and 55, and thereby lever 56, which is in direct engagement with a pocket on the under side of said ram, said fingers and said lever being fixedly attached to a shaft 57, which oscillates within bearings on bracket 41. When finger 54 is actuated, it causes the ram to go back empty, and when finger 55 is actuated this produces movement of the ram toward the furnace, and consequently the discharge of coal that may have been lodged in front of the ram at A through opening 29 upon deflector 30 and from there upon platform 31, from which it is projected by the shovel upon the grate in curves, as indicated in dotted lines at 58 in Fig. 1. The configurations and relative arrangements of the cams 36, 36′, and 36× and of cams 53 and the parts connecting therewith are such that directly after forward movement of the ram forward and return movement of the shovel will take place, the ram also returning to its rear position as soon as it has delivered the coal upon platform 31.

Spring 49 when the shovel is in a rearward position is under tension produced by tappet 41 forced upward by one of the cam-tappets 34, 34′, and 34×, and it will be seen that the higher said tappet 41 is lifted by one of the said tappets 34, 34′, and 34× the farther rearward will shovel 22, as well as arm 26, be swung, and the greater will be the tension on said spring, and consequently when the said cam-tappets 34, 34′, and 34× pass from contact with shovel-tappet 41 and spring 49 is thereby permitted to assume its normal position and to thus be relieved of tension the greater a force will be applied to the shovel as it projects the fuel into the furnace and the farther will be the throw of the coal into the furnace.

From the foregoing it will be noted that the shovel-moving means—that is, the cam and the cam-tappets—are automatically adjusted by the differential gearing to gradually increase the movement of the shovel in opposition to the tension device or spring 49 and that therefore the throw of the shovel will be automatically varied. The cam-tappets will be automatically swung or moved outward on the rotating carrying-gear 33 by the differential movement between said gear and the cam attached to the gear 35. The driving-shaft 19 and the carrying-gear 33 constitute what I shall term a "rotative element," the cam and the cam-tappets constituting a means operated by the rotative element to move the shovel in opposition to the tension device. The shovel-moving means is given a movement in addition to its shovel-actuating motion, thereby automatically adjusting it to vary the length of successive movements of the shovel in opposition to the tension device. It will be readily understood that I may vary the form of this shovel-moving means and may provide other means by which said shovel-moving means may be automatically adjusted for the purpose of varying the movement of the shovel in opposition to the tension device.

By reason of the automatic adjustment of the shovel-moving means the throw of the shovel is so regulated that the fuel will be evenly distributed over the grate-surface by the gradually-increasing strength of the throw of the shovel. If the fuel-bed is not advanced by minute steps, it is practically impossible to secure an even distribution of the fuel over the grate, and I have found it practically impossible to secure these minute steps or increases in the fuel-bed without providing the automatially-adjustable shovel-moving means. I consider this to be a very important feature of my invention. It will be readily seen that in advancing the fuel-bed by minute steps very small quantities of fuel may be deposited by the ram, and the shovel will at each throw have a comparatively small amount of fuel to move.

I have illustrated in Fig. 5 on an enlarged scale and diagrammatically and with the radial dimensions exaggerated the configuration of my preferred form of cams 36, 36′, and 36× and will now describe how the different tappets 34, 34′, and 34× are affected by it. Assuming gear-wheel 33 to have thirty teeth and gear-wheel 35 to have thirty-one teeth and pinions 37 and 38 to have ten teeth each, then upon each complete revolution of gear-wheel 33 gear-wheel 35 will fall behind to the extent of one-thirtieth of the periphery of gear-wheel 33, corresponding with a falling behind amounting to one-tenth of the length of cam 36, or if the original position of cam-tappet 34 was at *a* on cam 36, while also in engagement with shovel-tappet 41, after a complete revolution of gear-wheel 33 it will be at *b* on said cam, the distances between points *a b c*, &c., being each one-thirtieth of the entire circumference. The construction of my cams is such that points *a*, *a′*, and *a*× are equidistant from shaft 19, while points *b*, *b′*, and *b*× are also equidistant therefrom, but farther away from the shaft than points *a*, *a′*, and *a*×, this arrangement being continued with reference to points, as *c*, *c′*, and *c*×, &c. The relative positions of cams 36, 36′, and 36× are such that, providing at the beginning cam-tappet 34 contacts with cam 36 at *a*, while also in operative contact with shovel-tappet 41, after one-third of a revolution of gear 33 cam-tappet 34′ while coacting with shovel-tappet 41 will contact with point *a′*, after another one-third of a revolution cam-tappet 34× will so contact with *a*×, and three equal throws of coal will thus have been delivered directly adjoining the furnace-front. While gear 33 is making its next revolution, cam-tappet 34 will coact with point *b*, 34′ with *b′*, and 34× with $b^{\times}$ while also coacting with shovel-tappet 41 until another and adjoining one-tenth of the depth of the furnace has been covered with three charges of coal, and this mode of operation is continued until cam-tappet $34^{\times}$ contacts with $j^{\times}$, when the entire depth of the furnace will have been covered with a layer of coal of approximately even thickness, after which cam-tappet 34 will again simultaneously contact with point *a* and shovel-tappet 41, whereby the deposition of a new layer of coal will be started near the boiler-front.

Where I employ cams, as 36°, all of equal length, as illustrated in Fig. 15, having a continuous gradual curvature, I obtain a result approximately equal to that just described, each successive throw, however, being shifted to the extent of about one-thirtieth of the depth of the furnace away from the boiler-front as compared with the preceding one.

The above modes of supplying fuel to the furnace are particularly suited for anthracite coal. When it is desired to apply bituminous coal in thin layers, I substitute for pinion 38, having ten teeth, another pinion, having nine teeth, to coact with gear 35 of thirty-one teeth. This will, upon each complete revolution of gear 33, make gear 35 fall back four teeth and not one, as described above. Thus starting with cam-tappet 34 in contact with *a* and with shovel-tappet 41, cam-tappet 34′ will next contact with *b*′, $34^{\times}$ with $c^{\times}$, 34 with *d*, &c., thus making each throw different from the preceding one and covering the whole depth of the furnace by only ten throws and making the layer so supplied only one-third as thick as that supplied in the case of anthracite. Of course the number of the extent of throws desired can be regulated by the use of gearings proportioned accordingly.

It is desirable to assist the uniform distribution of the fuel as the same is being deposited upon the grate by the shovel and to equalize the same as far as practicable and particularly in a lateral direction, and for that purpose I prefer the grate-bars 59 to be placed upon frames 60, extending in the direction in which the throw of coal takes place and to arrange for rocking the same laterally to such direction simultaneously with the operation of the stoker, and to accomplish this I provide a bevel-wheel 61 on shaft 19, which wheel meshes with another bevel-wheel 62 on a shaft 63 and carries a stud 65, adjustable in a slot 66 along a crank 64 toward and away from shaft 63. Said stud actuates a slotted lever 67, fixedly secured to one end of shaft 68, which shaft oscillates within a bearing 69, secured to the boiler-front, and carries at its rear end a lever 70, provided with a pivot 71, engaging with a notch on the under side of a bar 72, running parallel with the boiler-front and having a series of perforations into which fit pivots 73 on levers 74 on the different grate-bars 59 in such manner that as lever 67 is being actuated, as described above, lateral rocking movement will be imparted to each of the grate-bars.

I do not wish to confine myself to the details and detail combinations herein set forth, as it will readily be seen that the same might be varied materially without departing from the spirit of my invention. Where a number of stokers are operated from the same main shaft, gears 33 and pinions 37, meshing therewith, might be omitted, except in the case of one stoker, plain disks instead of gear-wheels with tappets 34, 34′, and $34^{\times}$, however, being provided in each case. For shaft 39 one continuous shaft would then have to be substituted, on which the different pinions 38, meshing with gears 35, would have to be mounted.

The employment of antifriction-rollers between shaft 23 and its bearings and between eye 51 and pin 47 is of particular importance in this case not only on account of the sudden intense and reciprocating strains produced at these points, but also because on account of the close proximity to the furnace lubricating-oil cannot be suitably employed there.

Having thus described my invention, what I claim as new, and desire to secure by Letters Patent, is—

1. In a mechanical stoker, the combination with a shovel, of a cam, a cam-tappet adapted to engage with said cam, mechanism interposed between said cam-tappet and the shovel for actuating said shovel, and differential means for producing movement of said cam-tappet with reference to the cam.

2. In a mechanical stoker, the combination with a shovel, of a cam, a cam-tappet, adapted to engage with said cam, mechanism interposed between said cam-tappet and the shovel for actuating said shovel, and differential means embodying a gear-wheel for producing relative movements between said cam and said tappet.

3. In a mechanical stoker, the combination with a shovel, of a shaft, a gear-wheel mounted on said shaft, a cam-tappet adjusted to revolve with said gear-wheel, a second gear-wheel mounted on said shaft, a cam adjusted to revolve with said second gear-wheel and adapted to engage with said cam-tappet, means interposed between said gear-wheels for imparting differential movement from the first to the second wheel, one of said gear-wheels being fixedly and the other being revolubly mounted upon said shaft, and means for imparting movement from said tappet to said shovel.

4. In a mechanical stoker, the combination with a shovel, of mechanism comprising a cam and a shovel-tappet and a shaft upon which said tappet and said shovel are mounted, and means for actuating said cam for imparting movement to said shovel-tappet, said tappet being constructed in sections adjustably in their relative positions.

5. In a mechanical stoker the combination with a shovel, of mechanism comprising a cam, a shaft, and a shovel-tappet mounted upon said shaft and adapted to receive movement from said cam for actuating said shovel, said tappet being constructed in sections provided with serrated surfaces engaging with each other, and means for varying the relative positions of said serrated surfaces.

6. The combination with a furnace, of an oscillating shovel, means for actuating said shovel, the free edge of the shovel being provided with teeth extending at different angles with respect to the face of the shovel.

7. A mechanical stoker comprising a shovel, a tension means for moving said shovel in one direction, means by which said shovel may be moved in opposition to the tension device and then suddenly released, and means for automatically adjusting the said moving means, whereby the shovel will be moved varying distances against the tension device.

8. A mechanical stoker comprising a shovel, tension means for moving said shovel in one direction, means for moving said shovel in opposition to the tension means and then releasing it, and means for giving said shovel-moving means a movement in addition to its shovel-actuating motion and thereby automatically adjusting it to vary the length of the movements of the shovel in opposition to the tension device.

9. A mechanical stoker comprising a shovel, a tension means for moving said shovel in one direction, a rotative element, means operated by said rotative element to move the shovel in opposition to the tension device, and means for automatically adjusting said shovel-actuating means to vary the throw of the shovel.

10. A mechanical stoker comprising a shovel, a tension means for moving it in one direction, a rotative element, means carried by said rotative element for moving the shovel in opposition to the tension device, and means for automatically radially adjusting said means, whereby the shovel will be moved varying distances in opposition to the tension device.

11. A mechanical stoker comprising a shovel, a tension device for moving it in one direction, a rotating actuating element, a series of outwardly-moving devices adapted to be moved by the rotative element, and means for automatically moving said devices outward to the limit of their movement, and then dropping them back to the inner limit of their movement, whereby the movement of the shovel in opposition to the tension device will be gradually increased to its maximum and will then be dropped back to its minimum movement.

12. A mechanical stoker comprising a shovel, a tension means for moving it in one direction, a rotative element, means carried thereby to move the shovel in opposition to the tension device, and means for automatically adjusting said means to gradually increase the shovel movement from a minimum to a maximum and to then return it to a minimum.

13. A mechanical stoker comprising a shovel, a tension means for moving said shovel in one direction, a plurality of actuating devices adapted to move said shovel in opposition to the tension device, and means for automatically varying the positions of said actuating devices to vary the throw of the shovel.

14. A mechanical stoker comprising a shovel, a tension means for moving said shovel in one direction, a plurality of actuating devices adapted to move said shovel in opposition to the tension means, means to automatically and simultaneously vary the positions of said devices to vary the throw of the shovel.

15. A mechanical stoker comprising a shovel, a tension device for moving said shovel in one direction, a rotative element carrying a plurality of devices for moving said shovel in opposition to the tension device, and means for automatically varying the position of said devices.

16. A mechanical stoker comprising a shovel, a tension device for moving said shovel in one direction, a rotative element carrying a plurality of outward-moving devices for moving said shovel in opposition to the tension device, means for automatically moving said devices outward on the rotative element.

17. A mechanical stoker comprising a shovel, a tension means for moving said shovel in one direction, a rotative element, shovel-actuating devices carried by said element which in succession move the shovel in opposition to the tension device, and rotatable means for automatically varying the position of the shovel-operating devices, whereby the throw of the shovel will be varied.

18. A mechanical stoker comprising a shovel, a tension means for moving said shovel in one direction, a rotative element, shovel-actuating devices carried by said element, which, in succession, move the shovel in opposition to the tension device, and rotatable means having a differential movement with respect to the rotative element for au-

BEST AVAILABLE COPY tomatically varying the positions of the shovel-operating devices, whereby the throw of the shovel will be varied.

19. A mechanical stoker comprising a shovel, a tension means for moving it in one direction and automatically-adjusted means for moving the shovel varying distances against the tension means.

20. A mechanical stoker comprising a shovel, a tension means for moving it in one direction, rotative means for moving the shovel in opposition to the tension device, and means for giving said shovel-moving means a movement in addition to its rotative movement and thereby automatically adjusting it to vary the length of the movements of the shovel in opposition to the tension means.

JOHN A. CALDWELL.

Witnesses:
WM. R. DAVIS,
E. H. KAUFMANN.